US007621111B2

(12) United States Patent
Roberts

(10) Patent No.: US 7,621,111 B2
(45) Date of Patent: *Nov. 24, 2009

(54) SYSTEM AND METHOD FOR IDENTIFYING BALES OF HAY

(76) Inventor: Jeffrey S. Roberts, 1085 Nelson Farm Rd., Hudson, WI (US) 54016

( * ) Notice: Subject to any disclaimer, the term of this patent is extended or adjusted under 35 U.S.C. 154(b) by 0 days.

This patent is subject to a terminal disclaimer.

(21) Appl. No.: 12/218,726

(22) Filed: Jul. 18, 2008

(65) Prior Publication Data

US 2009/0025350 A1 Jan. 29, 2009

Related U.S. Application Data

(63) Continuation of application No. 11/344,548, filed on Feb. 1, 2006, now Pat. No. 7,415,924.

(51) Int. Cl.
*A01D 75/00* (2006.01)
*B30B 9/30* (2006.01)

(52) U.S. Cl. .................. 56/10.2 B; 56/341; 100/102

(58) Field of Classification Search .............. 56/10.2 R, 56/10.2 B, 341–344; 100/3, 4, 43, 44, 88, 100/100, 102, 179
See application file for complete search history.

(56) References Cited

U.S. PATENT DOCUMENTS

| 4,688,026 | A | 8/1987 | Scribner et al. |
| 6,248,963 | B1 | 6/2001 | Gottlober |
| 6,377,058 | B1 | 4/2002 | Pemrick |
| 6,378,276 | B1 | 4/2002 | Dorge et al. |
| 6,693,539 | B2 | 2/2004 | Bowers et al. |
| 6,712,276 | B1 | 3/2004 | Abali et al. |
| 6,817,522 | B2 | 11/2004 | Brignone et al. |

*Primary Examiner*—Robert E Pezzuto
(74) *Attorney, Agent, or Firm*—Skinner and Associates

(57) ABSTRACT

A system and method for tagging individual bales of hay as they are baled and recording information regarding the moisture, weight, preservative applied, field position, quality and other information available at the time of baling, all sequenced to the formation of the bale by a timing and positioning device.

3 Claims, 3 Drawing Sheets

SYSTEM AND METHOD FOR IDENTIFYING BALES OF HAY

CROSS REFERENCE TO RELATED APPLICATIONS

This application is a continuation of U.S. patent application Ser. No. 11/344,548, filed Feb. 1, 2006 now U.S. Pat. No. 7,415,924, which is hereby incorporated by reference.

BACKGROUND OF THE INVENTION

Hay baled from an individual farm can vary significantly in quality due to the growing factors affecting the crop being baled. The factors of soil type, exposure to the sun and wind, plant population and ground moisture are some of the major conditions that determine the amount of hay, the moisture of the hay and the components of the hay in different parts of the farm. Moisture, windrow thickness and consistency of the crop effect the weight of the bale as it is packed into a round or square hay bale. Bale weights can vary as much as 30% in the same field with the same baler. Moisture can vary as much as 50% from bale to bale in the same field of hay. These variations affect the value of the hay from bale to bale.

The feeding quality of a bale is directly related to the selling price of the hay or to the amount of hay a producer's livestock will consume. It has been the practice to core the bale after producing it, do a laboratory analysis of the bale and then associate those results with the bale before selling it or feeding it.

Most hay is sold on a weight basis. The practice of weighing hay once on a truck either at the shipping or receiving end is an accepted means of determining weight. But in many cases, this method requires extra distances for traveling to scales to attain this information and may result in adjustments being made to the bales on the truck to increase or decrease the loaded amount.

Hay baled outside of an accepted range will have several problems: if it has been baled too wet, it will heat once stacked with other bales and can spoil or cause the entire stack to get hot and even burn; hay baled too dry, will have low feed quality and acceptance. Previous methods for monitoring moisture have been limited to the operators of balers noting moisture problems and stopping the baler to mark the bales with problems.

Chemical hay preservatives are commonly used to preserve hay that is baled above the moisture level of 16%. Monitoring the amount of preservative applied to each bale is done on a general basis and there is no way to determine if individual bales have been treated with the correct amount of preservative after they have been baled.

Different hay fields and different parts of the same field will have different levels of hay quality. Sorting bales by their point of origin can be an indication of the type and quality of the hay in a particular bale. The state of the art is believed to include the following US patents:

| | | |
|---|---|---|
| 4,688,026 | August 1987 | Scribner et al. |
| 6,378,276 | April 2002 | Dorge et al. |
| 6,248,963 | June, 2001 | Gottlober |
| 6,817,522 | November 2004 | Brignone, et al. |
| 6,712,276 | March 2004 | Alabi et al. |
| 6,693,539 | February 2004 | Bowers, et al. |
| 6,377,058 B1 | June, 2002 | Pemrick |

BRIEF SUMMARY OF THE INVENTION

The method and system that has been invented allows for individual bales to be marked with identification tags as they are baled. At the time of marking, information pertaining to that bale is recorded and associated with the identification tag, including but not limited to bale moisture, bale weight, hay preservative applied, field position, and hay quality. The placement of the tag and coordination of information gathered from various inputs is accomplished by specific sequencing of signals inputted to a microprocessor and recorded to memory, based on the position of the system's components on a hay baler.

DETAILED DESCRIPTION OF THE INVENTION

Figure 1:
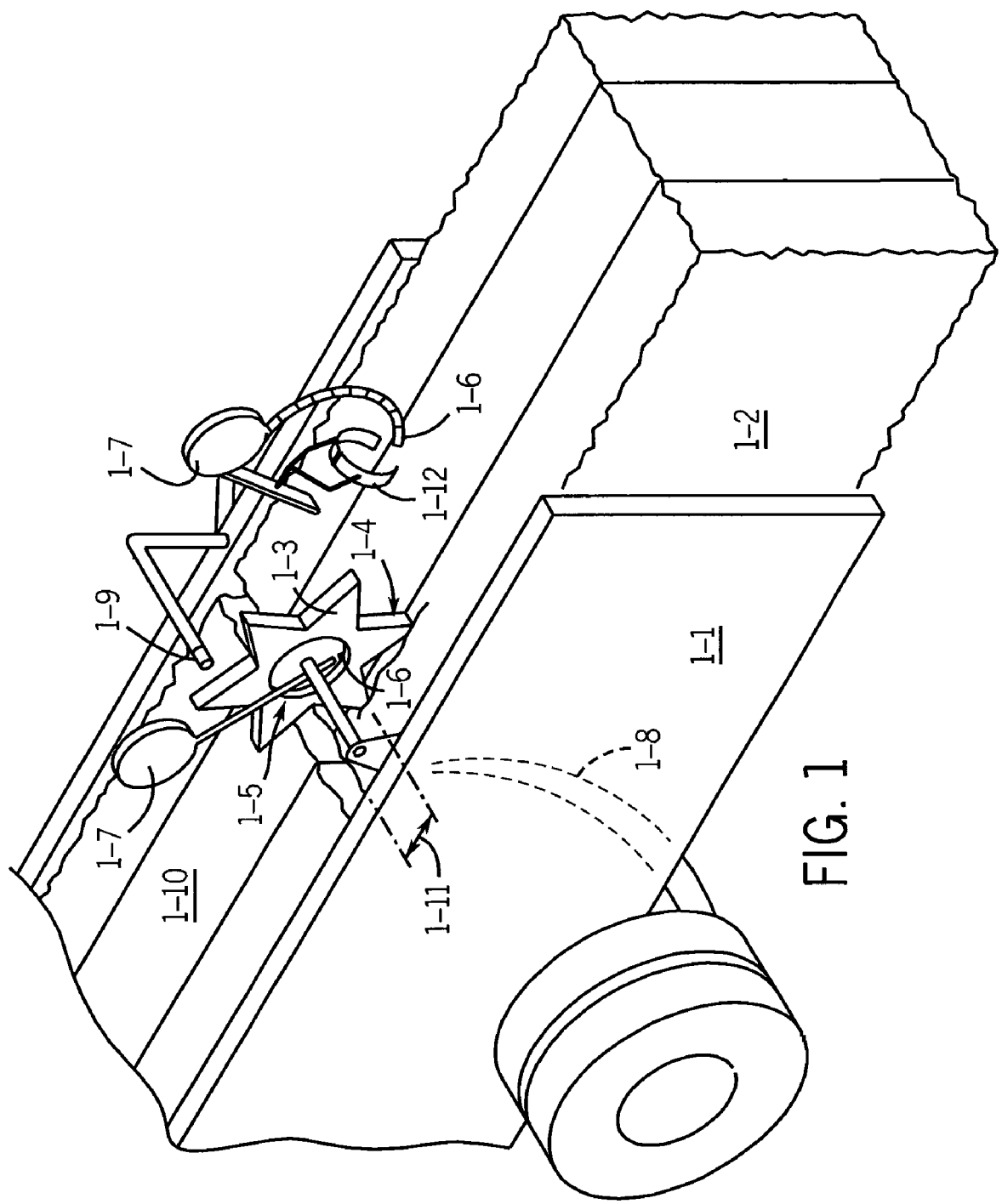
FIG. 1 shows a layout of the system on a square baler.
Figure 2:
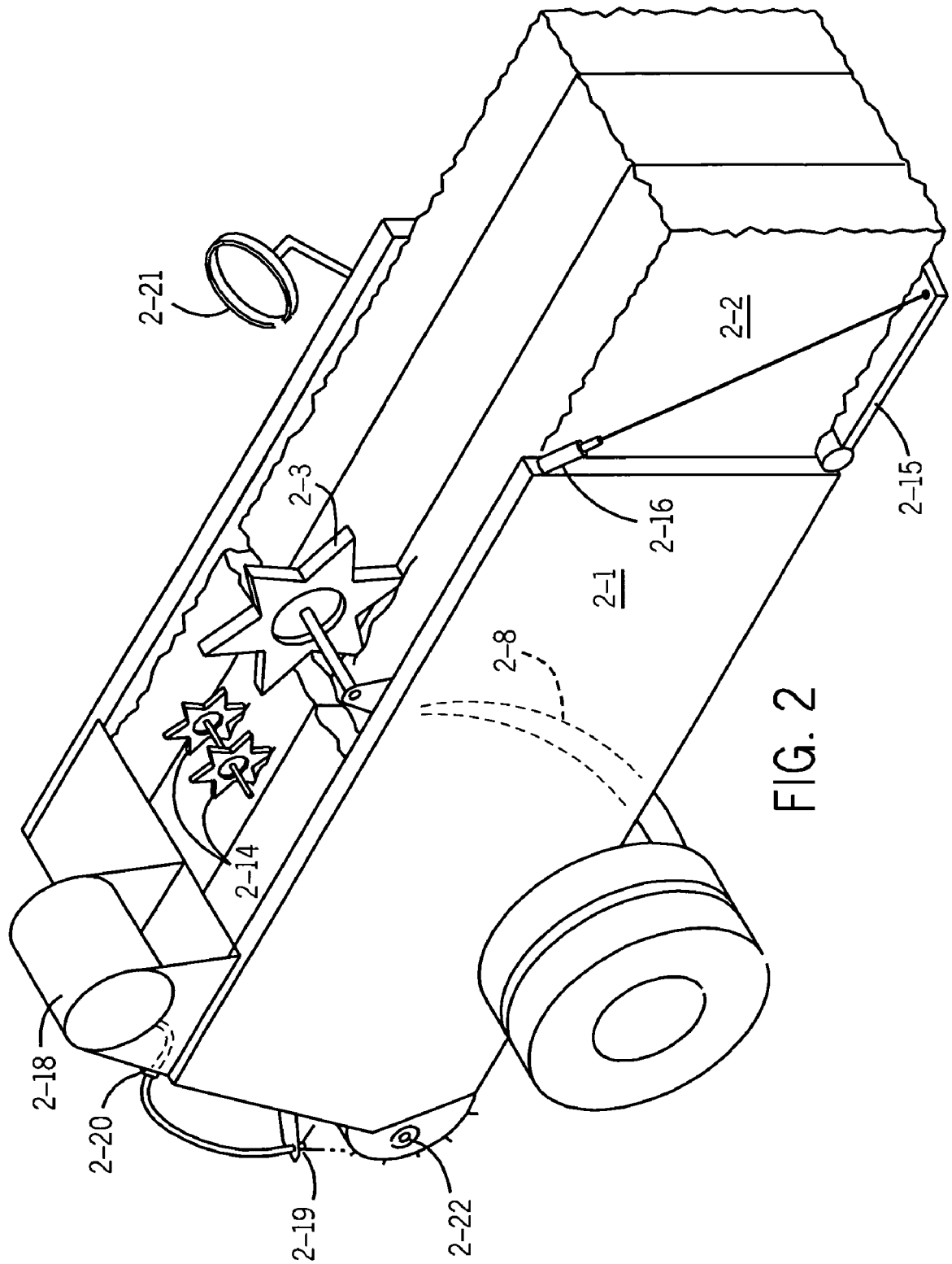
FIG. 2 shows a layout of the system with additional input sensors on a square baler.

Referring to FIG. 1, the method and system that has been invented mounts on a hay baler 1-1 and employs a device that tags bales 1-2 with an identification tag such as a radio frequency identification device (rfid) as the bale is formed. One such tagging device is a star wheel 1-3 rotating on the outside surface of the formed bale. This wheel can be both a timing device used for sequencing the marking of bales and recording information about, and part of an inserting device for placing identification tags used to identify each bale. When using this wheel as an inserting device, each spoke 1-4 of the star wheel has a hollow delivery path 1-5 through which an rfid tag 1-6 is inserted. The spoke temporarily spreads an opening in the bale and inserts the rfid tag 1-6 into the opening. When this method of tagging the bale is used the rfid tag 1-6 is made of an edible material so that it does not have to be removed before the bale is fed to livestock. The tag can be inserted through any of the spoke of the star wheel and is dispensed through the center of the wheel from a dispenser 1-7.

The tags employed in the embodiment of this system are sequenced as individually identifiable tags. They can be a radio frequency identification device (rfid). As a bale is tagged, a microprocessor writes to a memory the time the tag was dispensed, and information available about the bale at the time of tagging. When using rfid tags, a tag with memory may be employed in the system and information about the bale written to the memory of the tag as well as stored in separate memory.

Dispensing of a tag is triggered by picking up a signal from the tying cycle when the method is employed on a square baler 1-1. The timing star wheel 1-3 is positioned at a known distance 1-11 from the position on the bale where the twine is inserted by a needle 1-8 which is normally part of the baler's mechanism and defining the end of one bale 1-2 and the beginning of the next bale 1-10. When the twine arm cycles and thus the beginning of a bale is defined, a distance measurement is begun by the timing star wheel 1-3, by counting the revolutions of the star wheel. Revolutions of the timing star wheel 1-3 can be counted by a proximity sensor 1-9 counting the passing of the points of the star wheel or alternatively by a sensing device to count shaft rotations such as a Hall effect sensor. When a bale has traveled the distance between the twine arm and the star wheel 1-11, a microprocessor-based signal is sent to the tag dispenser 1-7 and a tag 1-6 is released into one spoke of the star wheel. Then that particular spoke makes contact with the hay, the tag 1-6 is dragged into the hay and remains with the hay.

Since the bale will later be identified by an rfid reading device, and since some tags can only be sensed from a short distance, a tag may be desirable in each end of the bale 1-2. In this embodiment of the system, two signals are sent by the microprocessor to the dispenser 1-7 the first sequenced based on a distance just inside the beginning of one bale and the second just after the beginning of the next bale. In this way, there will be a tag at each end of bales in stacks of hay; an rfid reader will receive a signal from either end of the bale.

Alternatively, the tag dispenser can work in conjunction with a twine-tagging device 1-12 to affix the tag around or under the bale twine, located adjacent to the timing star wheel 1-3. In this embodiment, the device 1-12 affixes an rfid tag around or under the twine of the bale when the dispenser 1-7 receives the signal from the microprocessor. The timing star wheel 1-3 will be used for timing of the system, but will not need the hollow spoke design 1-4 if it is not used for dispensing tags. Alternatively, some baler may already be equipped with a star wheel used primarily to time the activation of the twine arm and that wheel can be used for the distance measuring needed in this system for dispensing the tags in the proper position if it fitted with a rotational sensor to send information to the systems microprocessor. The twine tagging device 1-12 may also need a simultaneous signal or delay signal from the microprocessor to activate it based on its position relative to the needle 1-8, or this activation may be generated by the dispensing of a tag by the dispenser 1-7 which receives a signal from the microprocessor based on activation of the needle 1-8. The two-tag configuration will also work with the twine-tagging device in the same fashion as the star wheel dispensing system works. Tags used in this embodiment do not have to be edible by livestock consuming the hay since when affixed to the twine or under the twine, they will be disposed of prior to feeding the bale. An optical type of tag, such as an individual bar code for each bale can be employed in this variation of the system.

Sensors located in other parts of the baler are used in the system to gather information on the bale 2-2 which is now individually identified, the baler having a twine needle 2-8. The possibilities for inputs include but are not limited to, bale moisture, bale weight, amount of preservative applied, field location, and bale quality. Bale moisture is best attained from an additional pair of star wheels 2-14. These two wheels test moisture continuously in a method described by Pemrick (U.S. Pat. No. 6,377,058 B1). The position of these moisture-sensing wheels is configured into the microprocessor, so that the moisture readings taken on a continuous basis as the bale feeds through the baler, can be grouped, and averaged during the interval they are reading in the bale being identified as measured by the timing star wheel 2-3. These wheels are typically placed before the timing star wheel 2-3. The distance between the moisture sensing wheels 2-14 and the twine arm is measured by the timing wheel 2-3 and the moisture information from these sensors is grouped and associated with the tag of the bale being measured by the microprocessor and recorded to memory.

Another point of information associated with the individually identified bales in this system, is the weight of the bale. A scale may be fitted to the discharge chute of the baler 2-15. In this position further input from the timing star wheel 2-3 will be used so that the microprocessor records a bale weight when the bale is positioned on the chute so that a scale 2-16 can measure weight of that particular bale. The baler may also be equipped with a bale accumulator behind the baler (not shown), and the bale weight may be taken from that device adjusting the position input from the timing star wheel 2-3 accordingly.

If the baler is equipped with preservative application equipment 2-18, the amount of preservative applied to a bale can be recorded for the individually identified bales. Preservative is normally applied through non-compacted hay at the pick-up of the baler through spray nozzles 2-19 located at that position. The timing star wheel 2-3 will be used to measure the distance between the spray nozzles and the end and beginning of the bale as the processor records accumulated flow from a flow meter 2-20 located in the spray line going to the nozzles.

If the baler or tractor pulling the baler is equipped with a position-measuring device such as global positioning equipment 2-21, the position of the end or beginning of the bale individually identified, can be recorded by the microprocessor to on-board memory or recorder to an rfid tag with memory.

If the baler is equipped with hay quality measuring sensors such a near-infrared sensing equipment (NIR) input from those sensors 2-22, can be put in memory for the individually identified bale. NIR sensors are normally located to sense loose hay in the pick-up area 2-22 of the baler, so the timing star wheel 2-3 is used to sequence the information from these sensors with the bale individually identified.

Figure 3:
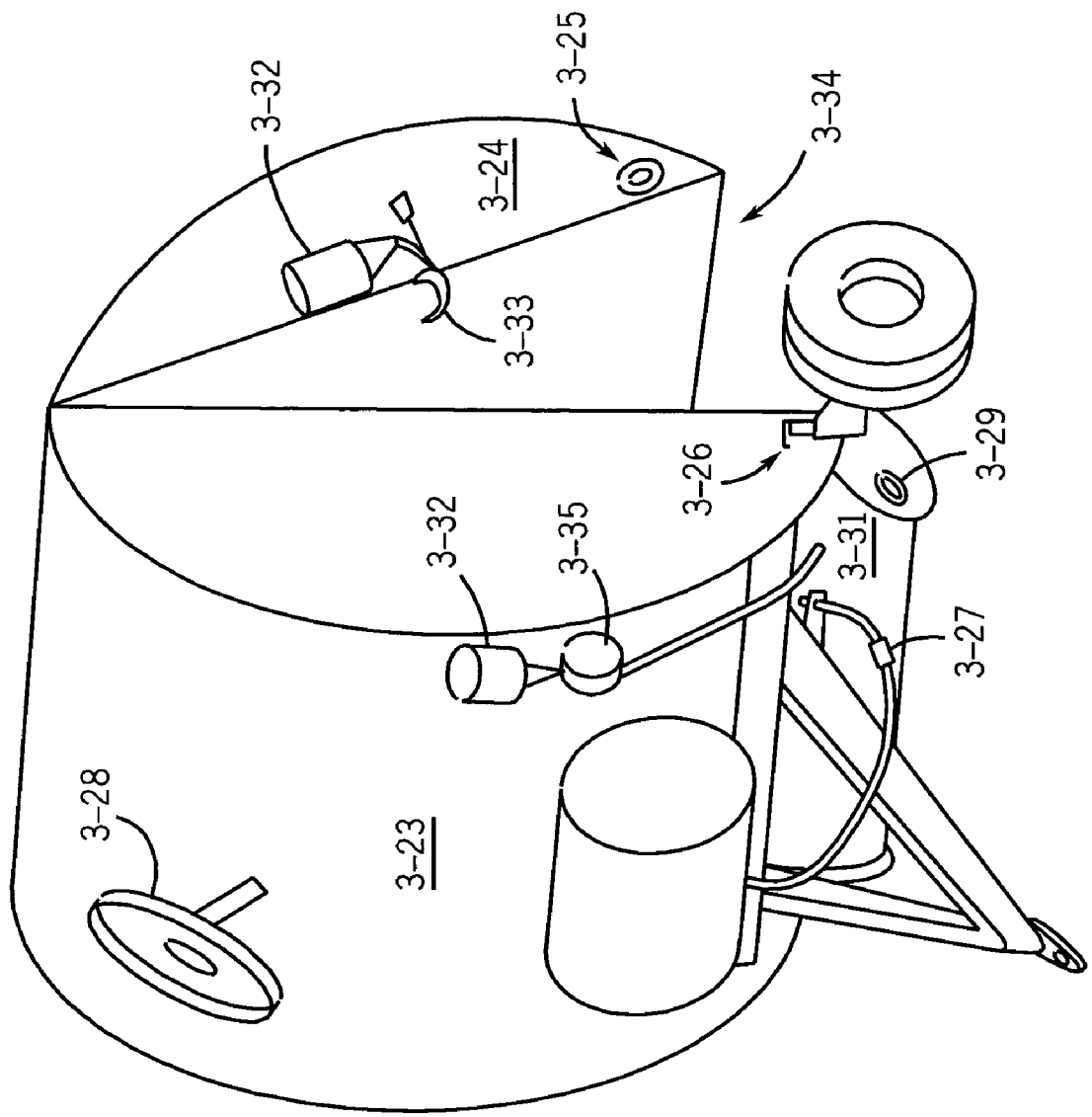
FIG. 3 shows a layout of the system on a round baler.

Referring also to FIG. 3, a round baler 3-23 can be equipped with a similar system so that the method and system of this invention can be employed by the operators of these balers. In this embodiment, information about an individual bale is normally accumulated for the entire bale. The bale is defined by picking up a signal from the discharge gate 3-24 closing, marking the beginning of a bale. If the baler is equipped with on-board moisture sensing equipment 3-25 such as those disclosed by Roberts (U.S. patent application Ser. No. 09/507,591), which is incorporated by reference, that signal is fed to the microprocessor while the bale is being formed. When the discharge gate 3-24 is opened, the accumulated moisture readings are averaged by the microprocessor and recorded in the memory or on the tag of the individual bales.

If the round baler is equipped with a weighing device such as a load cell on the baler's axel 3-26, the weight is taken and recorder just as the discharge gate 3-24 is opened signaling complete bale.

The round baler is equipped with a preservative applicator, accumulated flow readings from a flow meter 3-27 are recorder from the time the discharge gate 3-24 closes and the time it is opened and then associated with that individual bale.

If the round baler or tractor pulling it are equipped with positioning equipment such as a global positioning system 3-28, the position of the baler at the time the discharge gate is opened can be recorded in memory or on the identification tag.

If the round baler is equipped for feed quality monitoring equipment such as a nir sensor 3-29, these readings can be accumulated and averaged for the individually identified bale.

There are several types of tagging devices that may be employed in the system. One is a drop tube 3-35 that discharges an rfid tag into the intake area 3-31 of the round baler from a dispenser 3-32. The tag is discharged into the drop tube when the dispenser receives a signal from the microprocessor that is base on an interval long enough for-the bale to be started after the discharge gate 3-24 is closed. Another type of tagging device is an inserter 3-33 which inserts an rfid tag into the bale from a dispenser 3-32. The dispenser and inserter are activated by the microprocessor at the time the discharge gate 3-24 is opened. At this point, the bale has stopped turning in the baler and the formed bale is complete. Edible rfid tags must be used with both of these types of tagging devises. A third type of tagging devise is a twine-tagging device which crimps the tag around the bale twine or bale netting or places it under the twine or netting at the point the discharge gate 3-24 is opened as dispensed by dispenser device 3-32. In this embodiment, either an rfid tag or an optical tag, such as a bar code tag can be employed.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed:

1. A system for identifying individual square bales of hay by inserting or applying an identification tag to each bale as it is baled with a baler, comprising, a means for applying the identification tag, a timing star wheel for measuring the position of the bale, a processor for receiving information from the timing star wheel and outputting a signal to the means for applying the identification tag for inserting or applying the tag to the bale and for associating information about the bale to a memory.

2. The system as in claim 1, wherein the means for applying an identification tag is a twine-tagging device.

3. The system as in claim 1, wherein the baler is a square baler.

\* \* \* \* \*